United States Patent
Kwon et al.

(10) Patent No.: US 10,733,338 B2
(45) Date of Patent: Aug. 4, 2020

(54) METHODS AND APPARATUS TO GENERATE A SYNTHETIC POINT CLOUD OF A SPACECRAFT

(71) Applicant: The Boeing Company, Chicago, IL (US)

(72) Inventors: Hyukseong Kwon, Thousand Oaks, CA (US); Kyungnam Kim, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

(21) Appl. No.: 15/637,584

(22) Filed: Jun. 29, 2017

(65) Prior Publication Data
US 2019/0005162 A1    Jan. 3, 2019

(51) Int. Cl.
*G06F 30/20*     (2020.01)
*G06T 7/73*      (2017.01)
(Continued)

(52) U.S. Cl.
CPC .............. *G06F 30/20* (2020.01); *G06F 30/15* (2020.01); *G06T 7/337* (2017.01); *G06T 7/536* (2017.01);
(Continued)

(58) Field of Classification Search
CPC .......... G06F 17/50009; G06F 17/5095; G06F 2217/12; G06T 7/536; G06T 7/775;
(Continued)

(56) References Cited

U.S. PATENT DOCUMENTS

| | | | |
|---|---|---|---|
| 8,744,126 B1 * | 6/2014 | Rohrschneider | G06K 9/44 382/100 |
| 10,024,664 B1 * | 7/2018 | Gill | G01C 21/00 |

(Continued)

OTHER PUBLICATIONS

Fenton (Ronald C. Fenton, R. Rees Fullmer, Robert T. Pack, "Simulation tests of a lidar-based spacecraft pose determination algorithm," Proc. SPIE 6555, Sensors and Systems for Space Applications, 65550G (May 3, 2007), p. 1-12) (Year: 2007).*

(Continued)

*Primary Examiner* — Rehana Perveen
*Assistant Examiner* — Justin C Mikowski
(74) *Attorney, Agent, or Firm* — Hanley, Flight & Zimmerman, LLC

(57) ABSTRACT

Methods, apparatus, and articles of manufacture are disclosed to generate a synthetic point cloud of a spacecraft. An example apparatus includes a point cloud generator to generate a first synthetic point cloud of a first simulated space vehicle based on a simulated illumination source and a simulated image sensor, where the simulated illumination source and the simulated image sensor is operatively coupled to a second simulated space vehicle at a first position, where the simulated image sensor measures a parameter of the first simulated space vehicle, where the simulated illumination source uses a first configuration. The example apparatus further includes a pose determiner to determine a first pose of the simulated illumination source based on a first difference between the first synthetic point cloud and a reference synthetic point cloud using a first registration method, and a command generator to generate a command to move the second simulated space vehicle from the first position to a second position based on the first pose.

20 Claims, 9 Drawing Sheets

(51) Int. Cl.
*G06T 7/536* (2017.01)
*G06T 7/33* (2017.01)
*G06T 17/00* (2006.01)
*G06F 30/15* (2020.01)
*G06F 119/18* (2020.01)

(52) U.S. Cl.
CPC ............... *G06T 7/74* (2017.01); *G06T 7/75* (2017.01); *G06T 17/00* (2013.01); *G06F 2119/18* (2020.01); *G06T 2207/10028* (2013.01); *G06T 2207/10032* (2013.01); *G06T 2207/30244* (2013.01)

(58) Field of Classification Search
CPC ........... G06T 7/337; G06T 2207/10028; G06T 2207/30244
USPC .............................................................. 703/8
See application file for complete search history.

(56) References Cited

U.S. PATENT DOCUMENTS

| | | | | |
|---|---|---|---|---|
| 2005/0264556 | A1* | 12/2005 | Chang | G06T 15/20 345/419 |
| 2010/0208244 | A1* | 8/2010 | Earhart | G01S 3/7867 356/139.01 |
| 2012/0044476 | A1* | 2/2012 | Earhart | G01S 3/7867 356/4.01 |
| 2012/0261516 | A1* | 10/2012 | Gilliland | G01S 17/107 244/183 |
| 2013/0249229 | A1* | 9/2013 | Roberts | B25J 15/0226 294/198 |
| 2015/0199458 | A1* | 7/2015 | Bacon | G06F 17/5009 703/8 |
| 2015/0288947 | A1* | 10/2015 | Ahrns | G06K 9/6202 348/46 |
| 2015/0371431 | A1* | 12/2015 | Korb | G06T 9/00 382/113 |
| 2017/0158239 | A1* | 6/2017 | Dhome | B60T 8/1708 |
| 2018/0341021 | A1* | 11/2018 | Schmitt | G01S 17/89 |
| 2019/0156507 | A1* | 5/2019 | Zeng | G06T 7/70 |
| 2019/0180467 | A1* | 6/2019 | Li | G06T 7/70 |

OTHER PUBLICATIONS

Budge (Scott E. Budge, David B. Chester, "Simulation of a Doppler lidar system for autonomous navigation and hazard avoidance during planetary landing," Proc. SPIE 9832, Laser Radar Technology and Applications XXI, 983208 (May 13, 2016), p. 1-11) (Year: 2016).*

Scott D. Brown, Daniel D. Blevins, John R. Schott, "Time-gated topographic LIDAR scene simulation," Proc. SPIE 5791, Laser Radar Technology and Applications X, (May 19, 2005) (Year: 2005).*

John A. Christian and Scott Cryan, "A Survey of LIDAR Technology and its Use in Spacecraft Relative Navigation", Guidance, Navigation, and Control and Co-located Conferences, Aug. 19-22, 2013, Boston, MA, p. 1-7. (Year: 2013).*

Piotr Jasiobedzki, Stephen Se, Tong Pan, Manickam Umasuthan, Michael Greenspan, "Autonomous satellite rendezvous and docking using lidar and model based vision," Proc. SPIE 5798, Spaceborne Sensors II, (May 19, 2005), p. 1-13. (Year: 2005).*

Mike Lieber, Carl Weimer, Michelle Stephens, Ray Demara, "Development of a validated end-to-end model for space-based lidar systems," Proc. SPIE 6681, Lidar Remote Sensing for Environmental Monitoring VIII, 66810F (Sep. 26, 2007), p. 1-14. (Year : 2007).*

Michael F. Reiley, Dwayne C. Carmer, William F. Pont Jr., "Three-dimensional laser radar simulation for autonomous spacecraft landing," Proc. SPIE 1416, Laser Radar VI, (Aug. 1, 1991), p. 1-10. (Year: 1991).*

Puneet Singla et. al., "Adaptive Output Feedback Control for Spacecraft Rendezvous and Docking Under Measurement Uncertainty", Journal of Guidance, Control, and Dynamics vol. 29, No. 4, Jul.-Aug. 2006, p. 1-11. (Year: 2006).*

Rusinkiewicz et al., Efficient Variants of the ICP Algorithm, Stanford University, 2001, 8 pages.

Brown et al., Time-gated topographic LIDAR scene simulation, Digital Imaging and Remote Sensing Laboratory, 2005, 12 pages.

Peinecke et al., Lidar Simulation Using Graphics Hardware Acceleration, Institute of Flight Guidance, IEEE, 2008, 8 pages.

Ene et al., Assessing the accuracy of regional LiDAR-based biomass estimation using a simulation approach, Remote Sensing of Environment, www.elsevier.com/locate/rse, Aug. 2012, 15 pages.

Mendez et al., SIMLIDAR—Simulation of LIDAR performance in artificially simulated orchards, SciVerse ScienceDirect, www.elsevier.com/locate/issn/15375110, 2012, 12 pages.

Bechtold et al., Helios: a Multi-purpose Lidar Simulation Framework for Research, Planning and Training of Laser Scanning Operations with Airborne, Ground-based Mobile and Stationary Platforms, ISPRS Annals of the Photogrammetry, Remote Sensing and Spatial Information Sciences, vol. III-3, 2016, 8 pages.

* cited by examiner

METHODS AND APPARATUS TO GENERATE A SYNTHETIC POINT CLOUD OF A SPACECRAFT

FIELD OF THE DISCLOSURE

This disclosure relates generally to space vehicles and, more particularly, to methods and apparatus to generate a synthetic point cloud of a spacecraft.

BACKGROUND

Space vehicles such as aircraft and satellites typically use actuators such as thrusters and/or momentum devices to move in position relative to a target such as another space vehicle. Typically, a space vehicle uses onboard targeting and imaging systems to determine a position of the space vehicle relative to the target. The onboard targeting and imaging systems can convert three-dimensional images to two-dimensional images that can be interpreted and manipulated by a controller to perform space vehicle operations.

Figure 1:
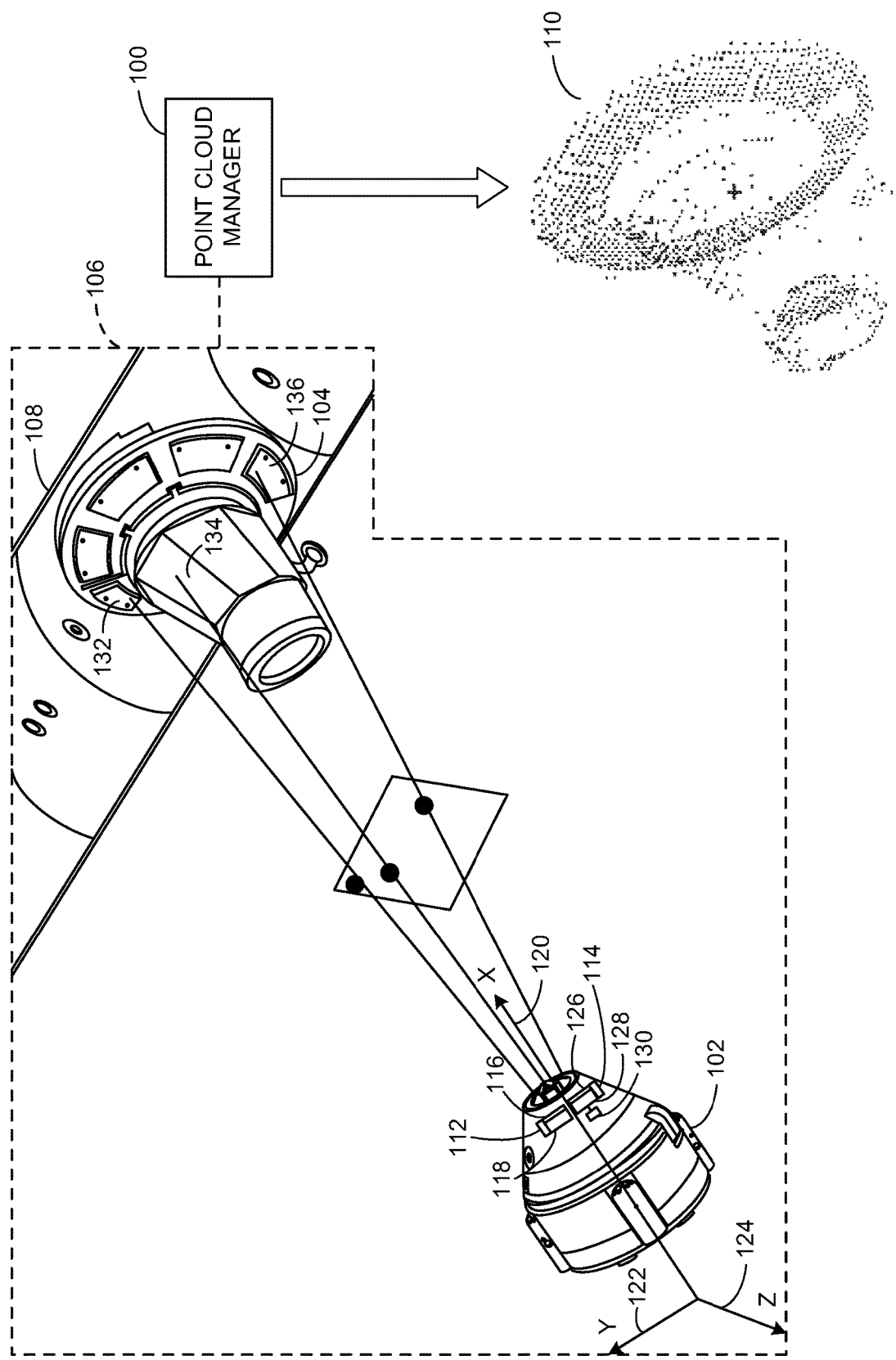
FIG. 1 is a schematic illustration of an example point cloud manager simulating a first example spacecraft scanning a second example spacecraft.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

Methods, apparatus, and articles of manufacture for generating a synthetic point cloud of a spacecraft are disclosed. An example apparatus includes a point cloud generator to generate a first synthetic point cloud of a first simulated space vehicle based on a simulated illumination source and a simulated image sensor, the simulated illumination source and the simulated image sensor operatively coupled to a second simulated space vehicle at a first position, the simulated image sensor measuring a parameter of the first simulated space vehicle, the simulated illumination source using a first configuration. The example apparatus further includes a pose determiner to determine a first pose of the simulated illumination source based on a first difference between the first synthetic point cloud and a reference synthetic point cloud using a first registration method, and a command generator to generate a command to move the second simulated space vehicle from the first position to a second position based on the first pose.

An example method includes generating a first synthetic point cloud of the first simulated space vehicle based on a simulated illumination source and a simulated image sensor, the simulated illumination source and the simulated image sensor operatively coupled to a second simulated space vehicle at a first position, the simulated image sensor measuring a parameter of the first simulated space vehicle, the simulated illumination source using a first configuration. The example method further includes determining a first pose of the simulated illumination source based on a first difference between the first synthetic point cloud and a reference synthetic point cloud using a first registration method, and generating a command to move the second simulated space vehicle from the first position to a second position based on the first pose.

A non-transitory computer readable storage medium comprising instructions which, when executed, cause a machine to at least generate a first synthetic point cloud of the first simulated space vehicle based on a simulated illumination source and a simulated image sensor, the simulated illumination source and the simulated image sensor operatively coupled to a second simulated space vehicle at a first position, the simulated image sensor measuring a parameter of the first simulated space vehicle, the simulated illumination source using a first configuration. The example instructions further cause the machine to at least determine a first pose of the simulated illumination source based on a first difference between the first synthetic point cloud and a reference synthetic point cloud using a first registration method, and generate a command to move the second simulated space vehicle from the first position to a second position based on the first pose.

Typical space vehicles such as aircraft and satellites use actuators such as thrusters and/or momentum devices to adjust position. In some examples, a space vehicle uses actuators to move relative to a target such as another space vehicle. In such examples, a space vehicle can conduct an autonomous space rendezvous, a proximity maneuver, a docking maneuver, etc., relative to another space vehicle such as a satellite, a space station, etc.

A typical space vehicle uses onboard targeting and imaging systems to determine a position of the space vehicle relative to a target. For example, a space vehicle may use the targeting system to illuminate a target with a light source and use the imaging system to process a reflection of the light source from the target. The imaging system may generate a point cloud image of the target based on processing multiple reflections and mapping the multiple reflections to a coordinate system in a computer-generated environment. The space vehicle may use the point cloud image to determine a position of the space vehicle in the coordinate system, a position of the target in the coordinate system, etc., to generate a command to adjust a position of the space vehicle from a first position to a second position.

In some examples, a targeting system includes an illumination source. For example, the illumination source may be a laser (e.g., an infrared laser, an ultraviolet laser, an X-ray laser, a gamma-ray laser, etc.). In such an example, the laser may be used to perform light detection and ranging (LIDAR). LIDAR is a remote sensing method that uses light in the form of a pulsed laser to measure ranges (e.g., variable distances, etc.) to an object (e.g., a space vehicle, etc.). Additionally or alternatively, any other type of illumination source may be used.

In some examples, the illumination source is operatively coupled to a pointing system. In such examples, the pointing system is a mechanical assembly such as a 2-degree of freedom movable bracket, a micro-mechanical mirror array, etc. For example, the laser may be mounted onto a movable platform that can be adjusted in translation and/or rotation. For example, the laser may be mounted onto a movable platform with 6-degrees of freedom. In such an example, the platform can be moved translationally based on moving forward or backward with respect to the X-axis of a geometric plane, left or right with respect to the Y-axis of the geometric plane, up or down with respect to the Z-axis of the geometric plane, etc. The platform may also be moved rotationally based on tilting side to side with respect to the X-axis (roll), tilting forward or backward with respect to the Y-axis (pitch), turning left or right with respect to the Z-axis (yaw), etc.

In some examples, an imaging system includes an image sensor, an optic assembly, and/or an image processor. For example, the image sensor may be an electro-optical image sensor, a light sensor array, etc., with a specific pixel size, a pixel sensitivity, response time, etc. For example, the image sensor may measure one or more parameters of an object, a target, etc. In such an example, the image sensor may be used to convert light (e.g., light photons, etc.) into an electrical signal (e.g., current, voltage, etc.). In such an example, the image sensor may be coupled to the optic assembly. In some examples, the optic assembly is a mechanical assembly such as a 2-degree of freedom movable bracket operatively coupled to a lens, an aperture, a shutter, a mirror, etc. For example, the image sensor may be mounted onto a movable platform that can be adjusted in translation and/or rotation. For example, the image sensor may be mounted onto a movable platform with 6-degrees of freedom as described above corresponding to the laser mounted to the movable platform. In some examples, the image processor generates an image based on information obtained from the light sensor array. In some examples, the image is a point cloud image.

Example point cloud manager (PCM) apparatus disclosed herein are operative to generate a point cloud or a synthetic point cloud of a space vehicle. In some disclosed examples, the PCM apparatus generates a point cloud image of a target such as a space vehicle. As used herein, the terms "point cloud" and "point cloud image" are used interchangeably and refer to an image constructed using a set of data points in a coordinate system. In a three-dimensional (3-D) coordinate system, the data points may be defined translationally and/or rotationally by X, Y, and Z coordinates. The set of data points when viewed together may represent an external surface of an object.

In some disclosed examples, the PCM apparatus generates a point cloud of a target to cause a space vehicle approaching the target to adjust position during a real-time operation of the space vehicle. For example, the PCM apparatus used by an aircraft approaching a docking station of a space station may generate a point cloud of the docking station. In such an example, the PCM apparatus may process the point cloud and determine an ensuing movement based on the processed point cloud. For example, the PCM apparatus may determine that the aircraft needs to adjust in position (e.g., move closer to the docking station, move away from the docking station, etc.) based on the processed point cloud.

In some disclosed examples, the PCM apparatus generates a synthetic point cloud of a target to cause a space vehicle approaching the target to adjust position during a simulation operation of the space vehicle. For example, an autonomous space rendezvous, a proximity maneuver, a docking maneuver, etc., of the space vehicle may be simulated based on generating synthetic point clouds. Simulating such maneuvers may be used to analyze a capability of a space vehicle prior to manufacturing and deploying the space vehicle. For example, testing the space vehicle using simulations based on synthetic point clouds may confirm a feasibility of a design of the space vehicle and, thus, reduce development and test costs of the space vehicle.

In some disclosed examples, the PCM apparatus generates a reference synthetic point cloud of a target from a known computer-aided design (CAD) model (e.g., a 2-D CAD model, a 3-D CAD model, etc.) of a target (e.g., a docking station, a space vehicle, etc.). For example, the PCM apparatus may generate a reference synthetic point cloud for a simulated docking structure of a simulated space station from a 3-D CAD model. In such an example, the PCM apparatus may store the reference synthetic point cloud in a database for comparisons to subsequently generated synthetic point clouds.

In some disclosed examples, the PCM apparatus generates a synthetic point cloud of the target from a perspective of a simulated space vehicle scanning the target using a simulated targeting system and a simulated imaging system. For example, the PCM apparatus may generate a synthetic point cloud of the simulated docking structure by simulating a targeting system and an imaging system of a simulated aircraft scanning the simulated docking structure. In such an example, the PCM apparatus may calculate a difference between the synthetic point cloud and the reference synthetic point cloud using point set registration (e.g., a registration method, a point matching method, etc.).

Point set registration is a process of generating a spatial transformation that aligns two data sets (e.g., point sets, etc.) such as point clouds. Generating the spatial transformation includes merging multiple data sets into a globally consistent model (e.g., a model within a defined computer generated geometric coordinate system, etc.), and mapping a new measurement to the registration model to identify features or to estimate a pose. In some disclosed examples, the point set registration is conducted using an iterative closest point (ICP) method. For example, the PCM apparatus may use the ICP method to minimize a difference between two point clouds. In such an example, the PCM apparatus may use the ICP method to keep one point cloud fixed (e.g., the reference synthetic point cloud of the target, etc.), while transforming a second point cloud (e.g., the synthetic point cloud of the target, etc.) to best match the first point cloud. The example PCM apparatus may revise (e.g., iteratively revise, etc.) the transformation via a combination of translation and/or rotation to minimize an error metric (e.g., a distance from the reference synthetic point cloud and the synthetic point cloud of the target, etc.). Additionally or alternatively, any other type of point set registration method may be used.

In some disclosed examples, the PCM apparatus determines a pose of an object (e.g., a target, a space vehicle, a laser operatively coupled to a space vehicle, etc.) in a coordinate system based on a model determined by a registration method. For example, the PCM apparatus may determine a position and orientation of the target by mapping the synthetic point cloud of the target to the reference synthetic point cloud of the target via a matching transform using an ICP method. In such an example, the PCM apparatus calculates an ICP matching transform based on the mapping and the ICP matching transform at frame zero (e.g., an initial position, an initial state, etc.) may be represented as described below in Equation (1):

$$H_{Err}^{0}=H_{ICP}^{0} \quad \text{Equation (1)}$$

In the illustrated example of Equation (1), the term $H_{ICP}^{0}$ represents the ICP matching transform at frame zero and the term $H_{Err}^{0}$ represents the registration error at frame zero.

At each frame, if an illumination source (e.g., a laser, etc.) scanning the target moves, the example PCM apparatus applies a corresponding motion transform $H_{motion}$ to an error homogenous transform from a previous frame before applying the ICP matching transform for registration. The example PCM apparatus uses the ICP method to compensate the motion deviations (along with previous errors) while registering the synthetic point cloud of the target. The example PCM apparatus may calculate the error homogenous transform at frame n for subsequent movements of the illumination source (e.g., subsequent frames, etc.) as described below in Equation (2):

$$H_{Err}^{n}=H_{ICP}^{n}*H_{motion}^{n}*H_{Err}^{n-1} \quad \text{Equation (2)}$$

In the illustrated example of Equation (2), the term $H_{Err}^{n}$ represents the error homogenous transform at frame n, the term $H_{ICP}^{n}$ represents the ICP matching transform at frame n, the term $H_{motion}^{n}$ represents the motion transform at frame n, and the term $H_{Err}^{n-1}$ represents the error homogenous transform at the preceding frame (e.g., frame n−1, etc.). By updating the pose of the illumination source, generating the synthetic point cloud of the target from the perspective of the illumination source scanning the target, and performing the point set registration as described above, the example PCM apparatus may perform the next step in a simulation more efficiently than in prior examples. For example, the PCM apparatus may perform the next step in the simulation of the space vehicle moving relative to the target without having to recalculate the reference synthetic point cloud of the target.

In some disclosed examples, the PCM apparatus identifies a registration method to use by comparing multiple registration methods. For example, the PCM apparatus may calculate a first difference between the reference synthetic point cloud and the synthetic point cloud of the target based on a first registration method. In such an example, the PCM apparatus may calculate a second difference between the reference synthetic point cloud and the synthetic point cloud of the target based on a second registration method. The example PCM apparatus may determine to use the first registration method based on the first difference satisfying an error threshold (e.g., the first difference is less than the second difference, the first difference is less than 10%, etc.).

In some disclosed examples, the PCM apparatus adjusts a configuration, a pose, etc., of the simulated targeting system and/or the simulated imaging system to generate a synthetic point cloud of a target. For example, the PCM apparatus may generate a first synthetic point cloud of the docking station based on a first configuration of the laser (e.g., a first laser vibration setting, a first laser noise setting, etc.) operatively coupled to the aircraft in a first position. In such an example, the PCM apparatus may generate a second synthetic point cloud of the docking station based on a second configuration of the laser (e.g., a second laser vibration setting, a second laser noise setting, etc.) operatively coupled to the aircraft in a second position. In some examples, the PCM apparatus calculates a difference between the first and the second synthetic point clouds and determines which configuration, pose, etc., to use based on the difference.

FIG. 1 is a schematic illustration of an example point cloud manager (PCM) 100 simulating a space vehicle 102 scanning a target 104 in a computer-generated environment 106. In the illustrated example, the space vehicle 102 is a simulated crew capsule such as the Boeing Crew Space Transportation (CST) Starliner 102. In the illustrated example, the target 104 is a simulated docking station coupled to a simulated space station 108. The space vehicle 102 may be used to transport crew, equipment, etc., to the space station 108 via the target 104. In the illustrated example, the computer-generated environment 106 is based on a 3-D coordinate system.

In the illustrated example of FIG. 1, the PCM 100 generates a synthetic point cloud 110 of the target 104 by simulating a targeting system 112 and an imaging system 114. The example PCM 100 simulates the targeting system 112 by simulating an illumination source 116 operatively coupled to a simulated pointing system 118. The example PCM 100 aligns the illumination source 116 with a point of interest on the target 104 by adjusting a position of the pointing system 118 (e.g., adjusting a pose of the pointing system 118, etc.). In the illustrated example, the PCM 100 aligns the illumination source 116 with a first surface 132, a second surface 134, and a third surface 136 of the target 104.

In the illustrated example, the illumination source 116 represents a laser. Additionally or alternatively, any other type of illumination source may be represented (e.g., an infrared illuminator, etc.). Although only one illumination source 116 is depicted, more than one illumination source 116 may be used. In the illustrated example, the pointing system 118 represents a six-degree of freedom movable mechanical bracket assembly that can be moved translationally with respect to an X-axis 120, a Y-axis 122, and a Z-axis 124. In the illustrated example, the pointing system 118 can be moved rotationally with respect to the X-axis 120 (roll), the Y-axis 122 (pitch), and the Z-axis 124 (yaw). Alternatively, the pointing system 118 may have fewer or more than six-degrees of freedom.

In the illustrated example of FIG. 1, the PCM 100 simulates the imaging system 114 by simulating an image sensor 126 operatively coupled to a simulated optic assembly 128. In the illustrated example, the imaging system 114 measures one or more parameters of the target 104 (e.g., a light reflection characteristic of a surface of the target 104, a distance between the image sensor 126 and a surface of the target 104, etc.) by obtaining a reflection of light, which is emitted by the illumination source 116, from the first through the third surfaces 132, 134, 136 of the target 104 by adjusting a position of the image sensor 126 via the optic assembly 128. For example, the PCM 100 may (1) obtain a first reflection of light from the first surface 132 with the imaging system 114, (2) adjust the targeting system 112 to illuminate the second surface 134, (3) obtain a second reflection of light from the second surface 134, and so on. In the illustrated example, the PCM 100 simulates an image processor 130 by converting the light reflection obtained by the image sensor 126 into a digital representation. In some examples, the PCM 100 calculates a pose of the target 104 in the computer-generated environment 106 based on one or more digital representations.

In the illustrated example, the image sensor 126 represents an electro-optical image sensor. Additionally or alternatively, any other type of image sensor may be represented such as a light sensor array. Although only one image sensor 126 is depicted, more than one image sensor 126 may be used. In the illustrated example, the optic assembly 128 represents a six-degree of freedom movable mechanical bracket assembly that can be moved translationally with respect to the X-axis 120, the Y-axis 122, and the Z-axis 124.

In the illustrated example, the optic assembly 128 can be moved rotationally with respect to the X-axis 120 (roll), the Y-axis 122 (pitch), and the Z-axis 124 (yaw). Alternatively, the optic assembly 128 may have fewer or more than six-degrees of freedom. In the illustrated example, the image processor 130 represents hardware that executes computer readable instructions to translate information from the image sensor 126 into one or more digital representations.

In the illustrated example of FIG. 1, the PCM 100 obtains the pose of the first surface 132 from the image processor 130 and adjusts the targeting system 112 and/or the imaging system 114 to rescan the target 104. In some examples, the PCM 100 rescans the target 104 to obtain another pose corresponding to the first surface 132 to determine whether the space vehicle 102 is approaching or moving away from the target 104. In some examples, the PCM 100 rescans the target 104 to obtain a pose of the second surface 134 or the third surface 136. For example, the PCM 100 may rescan the target 104 using a different configuration, setting, etc., of the illumination source 116, the pointing system 118, the image sensor 126, the optic assembly 128, the image processor 130, etc. In another example, the PCM 100 may rescan the target 104 using a different configuration, setting, etc., of the target 104. For example, the PCM 100 may simulate a different light reflection characteristic of the first through the third surfaces 132, 134, 136. In the illustrated example, the PCM 100 generates the synthetic point cloud 110 based on a set of poses obtained from the image processor 130 using one or more configurations, settings, etc., of the components of the target 104, targeting system 112, the imaging system 114, etc.

Figure 2:
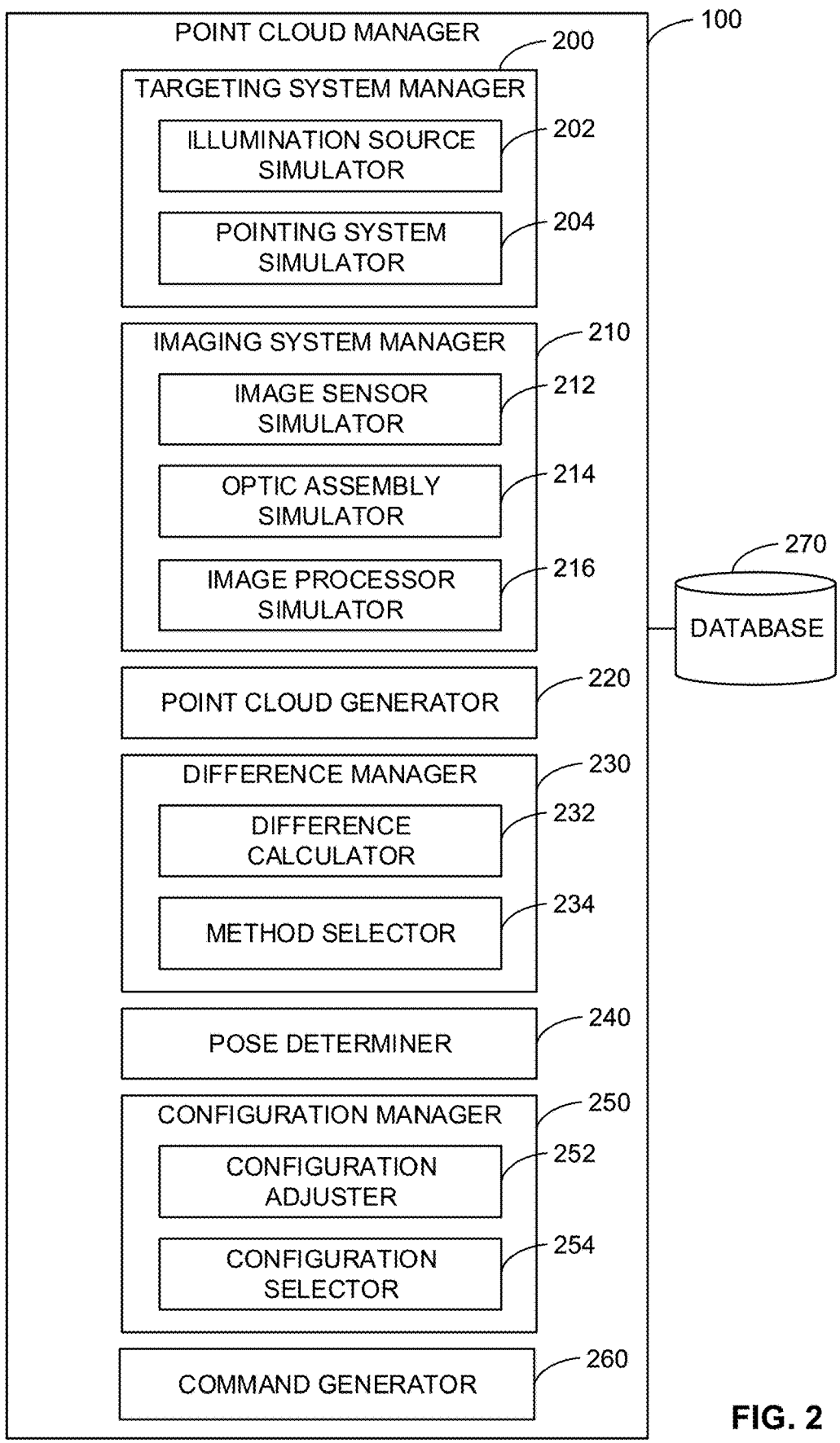
FIG. 2 is a block diagram of the example point cloud manager of FIG. 1 that may be used to implement the examples disclosed herein.

FIG. 2 is a block diagram of an example implementation of the example PCM 100 of FIG. 1. The example PCM 100 generates a synthetic point cloud of the target 104 based on simulating a scanning of the target 104 via simulating the targeting system 112 and the imaging system 114 of FIG. 1. In the illustrated example, the PCM 100 includes an example targeting system manager 200, an example illumination source simulator 202, an example pointing system simulator 204, an example imaging system manager 210, an example image sensor simulator 212, an example optic assembly simulator 214, an example image processor simulator 216, an example point cloud generator 220, an example difference manager 230, an example difference calculator 232, an example method selector 234, an example pose determiner 240, an example configuration manager 250, an example configuration adjuster 252, an example configuration selector 254, and an example command generator 260. The example PCM 100 may also be communicatively coupled to a database 270.

In the illustrated example of FIG. 2, the PCM 100 includes the targeting system manager 200 to coordinate a simulation of the targeting system 112 illuminating the target 104 of FIG. 1. For example, the targeting system manager 200 may simulate scanning the target 104 by simulating the illumination source 116 using an illumination source configuration (e.g., a setting, a parameter, etc., of the illumination source 116, etc.) and simulating the pointing system 118 using a pointing system configuration (e.g., a pose, a mechanical construction, etc., of the pointing system 118, etc.). In the illustrated example, the targeting system manager 200 includes the illumination source simulator 202 and the pointing system simulator 204.

In the illustrated example of FIG. 2, the targeting system manager 200 includes the illumination source simulator 202 to simulate the illumination source 116 of FIG. 1. For example, the illumination source simulator 202 may simulate a behavior, response, operation, etc., of a laser or any other type of illumination source to perform a LIDAR operation. In some examples, the illumination source simulator 202 simulates the illumination source 116 by defining corresponding illumination source characteristics and specifications. For example, the illumination source simulator 202 may simulate the laser by quantifying values for a vibration of the laser, laser noise (e.g., fluctuations in optical power, optical phase, etc.), etc. In another example, the illumination source simulator 202 may simulate the laser by quantifying values for a coherence, a directionality, a dispersion, an intensity, an energy, a frequency, a point size, a wavelength, etc., of the laser.

In the illustrated example of FIG. 2, the targeting system manager 200 includes the pointing system simulator 204 to simulate the pointing system 118 of FIG. 1. For example, the pointing system simulator 204 may simulate a mechanical construction of the pointing system 118 by quantifying values for dimensions, a size, a weight, etc., of the pointing system 118. In another example, the pointing system simulator 204 may simulate the pointing system 118 by quantifying a number of degrees of freedom to which the pointing system 118 can move. In such an example, the pointing system simulator 204 may simulate the pointing system 118 by configuring, defining, etc., the pointing system 118 to have six-degrees of freedom. For example, the pointing system simulator 204 may simulate an adjustment of a position of the pointing system 118 translationally and/or rotationally with respect to the X-axis 120, the Y-axis 122, and/or the Z-axis 124 of FIG. 1.

In the illustrated example of FIG. 2, the PCM 100 includes the imaging system manager 210 to coordinate a simulation of the imaging system 114 obtaining a light reflection from the first through the third surfaces 132, 134, 136 on the target 104. For example, the imaging system manager 210 may simulate obtaining a light reflection by simulating the image sensor 126 using an image sensor configuration (e.g., a setting, a parameter, etc., of the image sensor 126) and simulating the optic assembly 128 using an optic assembly configuration (e.g., a pose, a position, etc., of the optic assembly 128). In such an example, the imaging system manager 210 may translate the obtained light reflection into a digital representation by simulating the image processor 130 of FIG. 1 using an image processor configuration (e.g., a cycle time of a processor, a selection of an image processing algorithm, etc., of the image processor 130, etc.). In the illustrated example, the imaging system manager 210 includes the image sensor simulator 212, the optic assembly simulator 214, and the image processor simulator 216.

In the illustrated example of FIG. 2, the imaging system manager 210 includes the image sensor simulator 212 to simulate the image sensor 126 of FIG. 1. For example, the image sensor simulator 212 may simulate a behavior, response, operation, etc., of a light sensor array or any other type of image sensor to convert light into an electrical signal. In some examples, the image sensor simulator 212 simulates the image sensor 126 by defining corresponding sensor characteristics and specifications. For example, the image sensor simulator 212 may simulate a conversion gain, a sensitivity, noise (e.g., fixed pattern, temporal, etc.), spectral response, quantum efficiency, exposure time, etc., of the image sensor 126. In another or the same example, the image sensor simulator 212 may simulate the image sensor 126 measuring one or more parameters of the target 104.

In the illustrated example of FIG. 2, the imaging system manager 210 includes the optic assembly simulator 214 to simulate the optic assembly 128 of FIG. 1. For example, the optic assembly simulator 214 may simulate a mechanical construction of the optic assembly 128 by quantifying values for dimensions, a size, a weight, etc., of the optic assembly 128. In another example, the optic assembly simulator 214 may simulate the optic assembly 128 by quantifying a number of degrees of freedom to which the optic assembly 128 can move. In such an example, the optic assembly simulator 214 may simulate the optic assembly 128 by configuring, defining, etc., the optic assembly 128 to have six-degrees of freedom. For example, the optic assembly simulator 214 may simulate an adjustment of a position of the optic assembly 128 translationally and/or rotationally with respect to the X-axis 120, the Y-axis 122, and/or the Z-axis 124 of FIG. 1. In some examples, the optic assembly simulator 214 simulates the optic assembly 128 by including one or more optic assembly components such as a lens, an aperture, a shutter, a mirror, etc. In some examples, the optic assembly simulator 214 simulates the optic assembly 128 by simulating one or more characteristics and/or parameters of the one or more included optic assembly components.

In the illustrated example of FIG. 2, the imaging system manager 210 includes the image processor simulator 216 to simulate the image processor 130 of FIG. 1. For example, the image processor simulator 216 may simulate a behavior, response, operation, etc., of a processor or any other type of hardware executing machine readable instructions to convert obtained light via the image sensor 126 into a digital representation. In some examples, the image processor simulator 216 simulates the image processor 130 by defining corresponding processor, computing system, etc., characteristics and specifications. For example, the image processor simulator 216 may simulate processing power, memory capacity, etc., of the image processor 130. In some examples, the image processor simulator 216 identifies algorithms, machine readable instructions, etc., to simulate the image processor 130. For example, the image processor simulator 216 may identify an image processing script, program, etc., to be used by the image processor 130 to simulate convert obtained light into a digital representation for analysis, processing, etc.

In the illustrated example of FIG. 2, the PCM 100 includes the point cloud generator 220 to generate a synthetic point cloud based on a set of data points processed by the image processor 130. In some examples, the point cloud generator 220 generates a reference synthetic point cloud. For example, the point cloud generator 220 may generate a synthetic point cloud of the target 104 of FIG. 1 based on a 3-D CAD model of the target 104. In some examples, the point cloud generator 220 generates a synthetic point cloud. For example, the point cloud generator 220 may generate a synthetic point cloud of the target 104 based on a set of data points obtained by the image processor 130. In such an example, the set of data points are obtained by scanning the target 104 via simulating the targeting system 112 and/or the imaging system 114 of FIG. 1. In some examples, the point cloud generator 220 retrieves information (e.g., a parameter of the image sensor 126, the 3-D CAD model of the target 104, etc.) from the database 270. In some examples, the point cloud generator 220 stores information (e.g., the generated reference synthetic point cloud, the generated synthetic point cloud, etc.) in the database 270.

In the illustrated example of FIG. 2, the PCM 100 includes the difference manager 230 to coordinate calculating a difference between two or more synthetic point clouds using a registration method. For example, the difference manager 230 may identify a registration method such as an iterative closest point (ICP) method to use to calculate a difference. In such an example, the difference manager 230 may calculate a difference between the reference synthetic point cloud and the synthetic point cloud using the ICP method. In the illustrated example, the difference manager 230 includes the difference calculator 232 and the method selector 234.

In the illustrated example of FIG. 2, the difference manager 230 includes the difference calculator 232 to calculate a difference between two or more synthetic point clouds using a registration method. For example, the difference calculator 232 may calculate a difference between the reference synthetic point cloud and the synthetic point cloud of the target 104 using an ICP method. Additionally or alternatively, the difference calculator 232 may use any other type of registration method such as a robust point matching method, a thin plate spline robust point matching method, a kernel correlation method, a coherent point drift method, a sorting the correspondence space method, etc., to determine a difference between two or more synthetic point clouds.

In the illustrated example of FIG. 2, the difference manager 230 includes the method selector 234 to determine, identify, select, etc., a registration method to be implemented by the difference calculator 232. In some examples, the method selector 234 identifies a registration method to use based on calculating a difference between a reference synthetic point cloud and a synthetic point cloud of the target 104, comparing the difference to a threshold, and determining whether the difference satisfies the threshold. For example, the method selector 234 may identify an ICP method to use based on comparing a difference calculated using the ICP method to an error threshold and determining that the difference satisfies the error threshold (e.g., the difference is less than 5%, 10%, etc.). In some examples, the method selector 234 identifies a registration method based on selecting a reference synthetic point cloud of interest to process and/or a synthetic point cloud of interest to process. For example, the method selector 234 may select a reference synthetic point cloud based on a 3-D CAD model of the target 104 to process. In another example, the method selector 234 may select the synthetic point cloud 110 of FIG. 1.

In some examples, the method selector 234 identifies a registration method to use based on comparing calculated differences using multiple registration methods to each other. For example, the method selector 234 may identify a first registration method based on comparing a first difference calculated using the first registration method (e.g., an ICP method, etc.) to a second difference calculated using a second registration method (e.g., a robust point matching method, etc.). In such an example, the method selector 234 may select the first registration method based on the comparison. For example, the method selector 234 may select the first registration method based on determining that the first difference is less than the second difference and, thus, indicating that the first registration method is a better candidate than the second registration method for a specified operational scenario, environment, requirement, etc.

In some examples, the method selector 234 determines whether to select another registration method to process. For example, the method selector 234 may determine that there is another registration method yet to be selected (e.g., there is another registration method in a list of registration methods retrieved from the example database 270 yet to be used, etc.). Although only two registration methods are used in the above example, the example method selector 234 may identify a registration method based on analyzing, comparing, using, etc., any other number of registration methods.

In the illustrated example of FIG. 2, the PCM 100 includes the pose determiner 240 to determine a pose of an object in the computer-generated environment 106 of FIG. 1. For example, the pose determiner 240 may determine a position and/or an orientation of an object. In such an example, the pose determiner 240 may determine the position of the object and represent the position using a set of coordinates (e.g., (X, Y, Z), where X refers to a pixel location with respect to the X-axis 120, Y refers to a pixel location with respect to the Y-axis 122, and Z refers to a pixel location with respect to the Z-axis 124, etc.). In such an example, the pose determiner 240 may determine the orientation of the object and represent the orientation using a rotation matrix or a quaternion. For example, the pose determiner 240 may determine a position and/or an orientation of the space vehicle 102, the target 104, the illumination source 116, etc., of FIG. 1. In some examples, the pose determiner 240 may store information (e.g., the instant or current pose of the target 104, a calculated pose of the target 104, etc.) in the database 270. In some examples, the pose determiner 240 may retrieve information (e.g., a previously calculated pose of the target 104, a parameter corresponding to the computer-generated environment 106, etc.) from the database 270.

In the illustrated example of FIG. 2, the PCM 100 includes the configuration manager 250 to coordinate a simulation, an adjustment, a selection, etc., of a configuration, a parameter, etc., corresponding to an object in the computer-generated environment 106. In some examples, the configuration manager 250 determines whether to re-configure the target 104, the targeting system 112, the imaging system 114, etc. In the illustrated example, the PCM 100 includes the configuration adjuster 252 and the configuration selector 254.

In the illustrated example of FIG. 2, the configuration manager 250 includes the configuration adjuster 252 to adjust, simulate, etc., a configuration, a parameter, etc., corresponding to an object in the computer-generated environment 106. For example, the configuration adjuster 252 may change a level of intensity of the illumination source 116 from a first intensity level to a second intensity level, where the first is different from the second. In another example, the configuration adjuster 252 may change a light reflection parameter of the first surface 132 on the target 104 from a first light reflection parameter to a second light reflection parameter, where the first is different from the second.

In some examples, the configuration adjuster 252 determines whether to re-configure an object in the computer-generated environment 106. In such examples, the configuration adjuster 252 adjusts (e.g., iteratively adjusts, etc.) a parameter of the object until a calculated difference based on the parameter is optimized (e.g., changing the parameter does not decrease the difference, etc.). For example, the configuration adjuster 252 may determine whether to re-configure the first surface 132 of the target 104. In such an example, the configuration adjuster 252 may compare (1) a first calculated difference between a first synthetic point cloud of the target 104 based on the first surface 132 having a first light reflection characteristic and a reference synthetic point cloud of the target 104 to (2) a second calculated difference between a second synthetic point cloud of the target 104 based on the first surface 132 having a second light reflection characteristic and the reference synthetic point cloud of the target 104. The example configuration adjuster 252 may determine to re-configure the first surface 132 from the first to the second light reflection characteristic based on the second difference being less than the first difference. Alternatively, the example configuration adjuster 252 may determine not to re-configure the first surface 132 from the first to the second light reflection characteristic based on the first difference being less than the second difference.

In the illustrated example of FIG. 2, the configuration manager 250 includes the configuration selector 254 to select a configuration, a parameter, etc., corresponding to an object in the computer-generated environment 106 based on a difference between two or more synthetic point clouds. For example, the configuration selector 254 may select a level of intensity of the illumination source 116 based on comparing a first difference and a second difference. In such an example, the first difference may be a difference between the reference synthetic point cloud and a first synthetic point cloud of the target 104 using a first intensity level. In such an example, the second difference may be a difference between the reference synthetic point cloud and a second synthetic point cloud of the target 104 using a second intensity level. The example configuration selector 254 may select the first intensity level based on the comparison of the first difference to the second difference. For example, the configuration selector 254 may select the first intensity level based on the first difference being less than the second difference, the first difference satisfying an error threshold (e.g., the first difference is less than 5%, 10%, etc.). In such an example, the configuration selector 254 may select the first intensity level because the first difference may indicate that the first configuration of the illumination source 116 (e.g., the first intensity level, etc.) generated a synthetic point cloud that more closely matches the reference synthetic point cloud than the second configuration of the illumination source 116 (e.g., the second intensity level, etc.).

In the illustrated example of FIG. 2, the PCM 100 includes the command generator 260 to generate a command to move an object in the computer-generated environment 106. In some examples, the command generator 260 generates a command to adjust a pose of an object. For example, the command generator 260 may determine to move the target 104 from a first target pose to a second target pose to re-scan the target 104 using the targeting system 112 and the imaging system 114. In another example, the command generator 260 may determine to move the illumination source 116 from a first illumination source pose to a second illumination source pose by adjusting the pointing system 118 from a first pointing system pose to a second pointing system pose. The example PCM 100 may re-scan the target 104 based on a change in pose of the target 104, the illumination source 116, or any other object in the computer-generated environment 106. In some examples, the command generator 260 determines whether to continue simulating the computer-generated environment 106. For example, the command generator 260 may determine that a change in pose of the illumination source 116 relative to the target 104 indicates that the space vehicle 102 successfully engaged the target 104 (e.g., the space vehicle 102 successfully docked with the target 104, the space vehicle 102 successfully moved from a first position to a second position, etc.).

In the illustrated example of FIG. 2, the PCM 100 is communicatively coupled to the database 270. In the illustrated example, the database 270 records data (e.g., a 3-D CAD model of an object, a reference synthetic point cloud, a synthetic point cloud, a configuration of the illumination source 116, a light reflection parameter of the first surface 132 of the target 104, etc.). The example database 270 may be implemented by a volatile memory (e.g., a Synchronous Dynamic Random Access Memory (SDRAM), Dynamic Random Access Memory (DRAM), Rambus Dynamic Random Access Memory (RDRAM), etc.) and/or a non-volatile memory (e.g., flash memory). The example database 270 may additionally or alternatively be implemented by one or more double data rate (DDR) memories, such as DDR, DDR2, DDR3, DDR4, mobile DDR (mDDR), etc. The example database 270 may additionally or alternatively be implemented by one or more mass storage devices such as hard disk drive(s), compact disk drive(s), digital versatile disk drive(s), solid-state disk drive(s), etc. While in the illustrated example the database 270 is illustrated as a single database, the database 270 may be implemented by any number and/or type(s) of databases. Furthermore, the data stored in the database 270 may be in any data format such as, for example, binary data, comma delimited data, tab delimited data, structured query language (SQL) structures, etc. Although the database 270 is depicted in the illustrated example as being separate from the PCM 100, additionally or alternatively, the database 270 may be included in the PCM 100. The example database 270 may be communicatively coupled to one or more of the example targeting system manager 200, the example illumination source simulator 202, the example pointing system simulator 204, the example imaging system manager 210, the example image sensor simulator 212, the example optic assembly simulator 214, the example image processor simulator 216, the example point cloud generator 220, the example difference manager 230, the example difference calculator 232, the example method selector 234, the example pose determiner 240, the example configuration manager 250, the example configuration adjuster 252, the example configuration selector 254, and the example command generator 260.

While an example manner of implementing the PCM 100 of FIG. 1 is illustrated in FIG. 2, one or more of the elements, processes and/or devices illustrated in FIG. 2 may be combined, divided, re-arranged, omitted, eliminated and/or implemented in any other way. Further, the example targeting system manager 200, the example illumination source simulator 202, the example pointing system simulator 204, the example imaging system manager 210, the example image sensor simulator 212, the example optic assembly simulator 214, the example image processor simulator 216, the example point cloud generator 220, the example difference manager 230, the example difference calculator 232, the example method selector 234, the example pose determiner 240, the example configuration manager 250, the example configuration adjustor 252, the example configuration selector 254, the example command generator 260 and/or, more generally, the example PCM of FIG. 1 may be implemented by hardware, software, firmware and/or any combination of hardware, software and/or firmware. Thus, for example, any of the example targeting system manager 200, the example illumination source simulator 202, the example pointing system simulator 204, the example imaging system manager 210, the example image sensor simulator 212, the example optic assembly simulator 214, the example image processor simulator 216, the example point cloud generator 220, the example difference manager 230, the example difference calculator 232, the example method selector 234, the example pose determiner 240, the example configuration manager 250, the example configuration adjustor 252, the example configuration selector 254, the example command generator 260 and/or, more generally, the example PCM 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example targeting system manager 200, the example illumination source simulator 202, the example pointing system simulator 204, the example imaging system manager 210, the example image sensor simulator 212, the example optic assembly simulator 214, the example image processor simulator 216, the example point cloud generator 220, the example difference manager 230, the example difference calculator 232, the example method selector 234, the example pose determiner 240, the example configuration manager 250, the example configuration adjustor 252, the example configuration selector 254 and/or the example command generator 260 is/are hereby expressly defined to include a non-transitory computer readable storage device or storage disk such as a memory, a digital versatile disk (DVD), a compact disk (CD), a Blu-ray disk, etc. including the software and/or firmware. Further still, the example PCM 100 of FIG. 1 may include one or more elements, processes and/or devices in addition to, or instead of, those illustrated in FIG. 2, and/or may include more than one of any or all of the illustrated elements, processes and devices.

FIGS. 3A, 3B, 3C, 3D, and 3E illustrate example first through fifth synthetic point cloud images 300, 302, 304, 306, 308 of the target 104 of FIG. 1 generated by the example PCM 100 of FIGS. 1-2. For example, the PCM 100 may generate the first through fifth synthetic point cloud images 300, 302, 304, 306, 308 based on a configuration of the targeting system 112 (e.g., a configuration of the illumination source 116, the pointing system 118, etc.) and/or the imaging system 114 (e.g., a configuration of the image sensor 126, the optic assembly 128, etc.) of FIG. 1. In another example, the PCM 100 may generate the first through the fifth synthetic point cloud images 300, 302, 304, 306, 308 based on a configuration of the target 104, a parameter or a set of parameters corresponding to a component of the target 104 (e.g., a parameter corresponding to a light reflection characteristic of the first surface 132, the second surface 134, etc.).

Figure 3A:
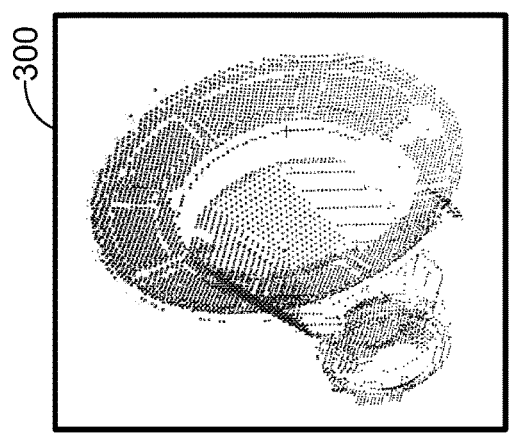
FIGS. 3A, 3B, 3C, 3D, and 3E illustrate example synthetic point cloud images generated by the example point cloud manager of FIGS. 1-2.

In the illustrated example of FIG. 3A, the first synthetic point cloud image 300 is a synthetic point cloud generated by the PCM 100 in accordance with the teachings of this disclosure. For example, the PCM 100 may generate the first synthetic point cloud image 300 based on an optimal configuration of the targeting system 112 of FIG. 1, an optimal configuration of the imaging system 114 of FIG. 1, an optimal light reflection characteristic of the first surface 132 of the target 104, etc.

In the illustrated example, the first synthetic point cloud image 300 represents an ideal simulation scan of the target 104 generated by the PCM 100. For example, the first synthetic point cloud image 300 may represent an ideal approximation of a point cloud generated by an actual (e.g., non-simulated, etc.) targeting system and an actual imaging system operatively coupled to an actual spacecraft scanning an actual target (e.g., an actual docking station, etc.). In such an example, the PCM 100 may determine that a generated synthetic point cloud is an ideal approximation (e.g., a synthetic point cloud that may be used for further analysis, processing, etc.) based on satisfying an error threshold. For example, the PCM 100 may calculate a first difference between a reference synthetic point cloud of the target 104 and the first synthetic point cloud 300, compare the first difference to an error threshold, and determine that the first difference satisfies the error threshold (e.g., the first difference is less than 1%, less than 5%, etc.).

Figure 3B:
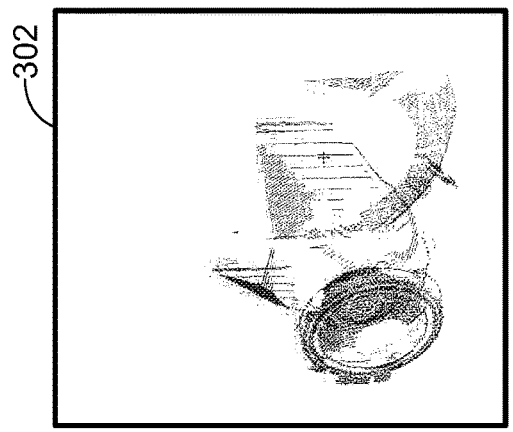

In the illustrated example of FIG. 3B, the second synthetic point cloud image 302 is a synthetic point cloud generated by the PCM 100 based on the PCM 100 configuring the illumination source 116 of FIG. 1 with too narrow of a field of coverage (e.g., an area that the illumination source 116 can illuminate, scan, target, etc.). For example, the PCM 100 may generate the second synthetic point cloud image 302 based on configuring the illumination source 116 with a sub-optimal configuration compared to the first synthetic point cloud image 300. In such an example, the PCM 100 may determine that the second synthetic point cloud image 302 does not satisfy an error threshold. For example, the PCM 100 may calculate a second difference between a reference synthetic point cloud of the target 104 and the second synthetic point cloud 302, compare the second difference to an error threshold, and determining that the second difference does not satisfy the error threshold (e.g., the second difference is greater than 1%, greater than 5%, etc.). In response to the second difference not satisfying the error threshold, the example PCM 100 may re-configure the illumination source 116 with a wider field of coverage to generate a synthetic point cloud that produces a closer match (e.g., a similar calculated difference, etc.) to the first example synthetic point cloud image 300 or to generate the first example synthetic point cloud image 300.

Figure 3C:
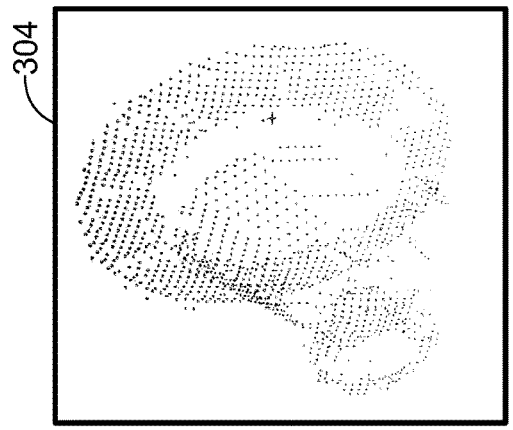

In the illustrated example of FIG. 3C, the third synthetic point cloud image 304 is a synthetic point cloud generated by the PCM 100 based on the PCM 100 configuring the illumination source 116 with too large of an angular deviation between sampling points. For example, the PCM 100 may generate the third synthetic point cloud image 304 based on configuring the illumination source 116 with a sub-optimal configuration compared to the first synthetic point cloud image 300. In such an example, the PCM 100 may determine that a calculated third difference based on the third synthetic point cloud image 304 does not satisfy an error threshold as described above in accordance with FIG. 3B. In response to the third difference not satisfying the error threshold, the example PCM 100 may re-configure the illumination source 116 with a smaller angular deviation between sampling points to generate a synthetic point cloud that produces a closer match to the first example synthetic point cloud image 300 or to generate the first example synthetic point cloud image 300.

Figure 3D:
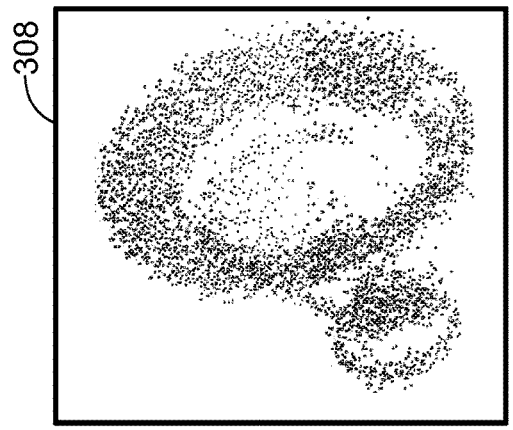

In the illustrated example of FIG. 3D, the fourth synthetic point cloud image 306 is a synthetic point cloud generated by the PCM 100 based on the PCM 100 considering a light reflection characteristic of one or more surfaces of the target 104. For example, the PCM 100 may generate the fourth synthetic point cloud image 306 based on configuring the first surface 132 of the target 104 using a first light reflection characteristic that is comparable to a second light reflection characteristic of the first surface 132 used to generate the first synthetic point cloud image 300. In such an example, the first and the second light reflection characteristic may be the same.

In the illustrated example of FIG. 3D, the PCM 100 may determine that a calculated fourth difference based on the fourth synthetic point cloud image 306 does not satisfy an error threshold as described above in accordance with FIG. 3B. In response to the fourth difference not satisfying the error threshold, the example PCM 100 may determine that another component may need to be re-configured instead of the first light reflection characteristic of the first surface 132. For example, the PCM 100 may determine to re-configure a component in the targeting system 112, the imaging system 114, etc., with a different configuration to generate a synthetic point cloud that produces a closer match to the first example synthetic point cloud image 300 or to generate the first example synthetic point cloud image 300. In such an example, the PCM 100 may determine that the first light reflection characteristic of the first surface 132 is optimized. For example, adjusting the first light reflection characteristic while keeping other parameters fixed will not decrease a difference between the reference synthetic point cloud and a synthetic point cloud of the target 104.

Figure 3E:
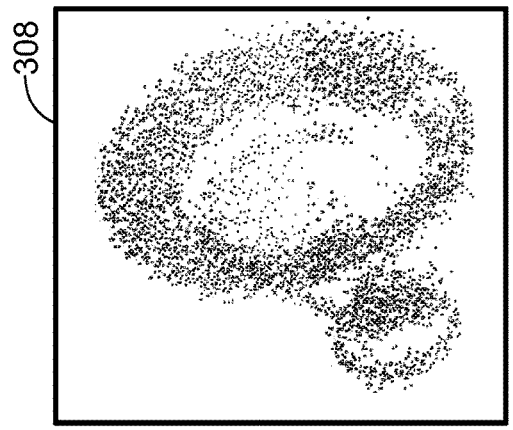

In the illustrated example of FIG. 3E, the fifth synthetic point cloud image 308 is a synthetic point cloud generated by the PCM 100 based on the PCM 100 configuring the illumination source 116, the image sensor 126, the first surface 132 of FIG. 1, etc., with increased depth noise compared to a configuration of the illumination source 116, the image sensor 126, the first surface 132, etc., in FIG. 3A. For example, a depth noise characteristic may be applicable to any object in the computer-generated environment 106 of FIG. 1. The example PCM 100 may determine that a calculated fifth difference based on the fifth synthetic point cloud image 308 does not satisfy an error threshold as described above in accordance with FIG. 3B. In response to the fifth difference not satisfying the error threshold, the example PCM 100 may re-configure the illumination source 116, the image sensor 126, the first surface 132, etc., with a different and/or more representative depth noise configuration to generate a synthetic point cloud that produces a closer match to the first example synthetic point cloud image 300 or to generate the first example synthetic point cloud image 300.

Flowcharts representative of example methods for implementing the PCM 100 of FIGS. 1-2 is shown in FIGS. 4-8. In these examples, the methods may be implemented using machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-8, many other methods of implementing the example PCM 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 4:
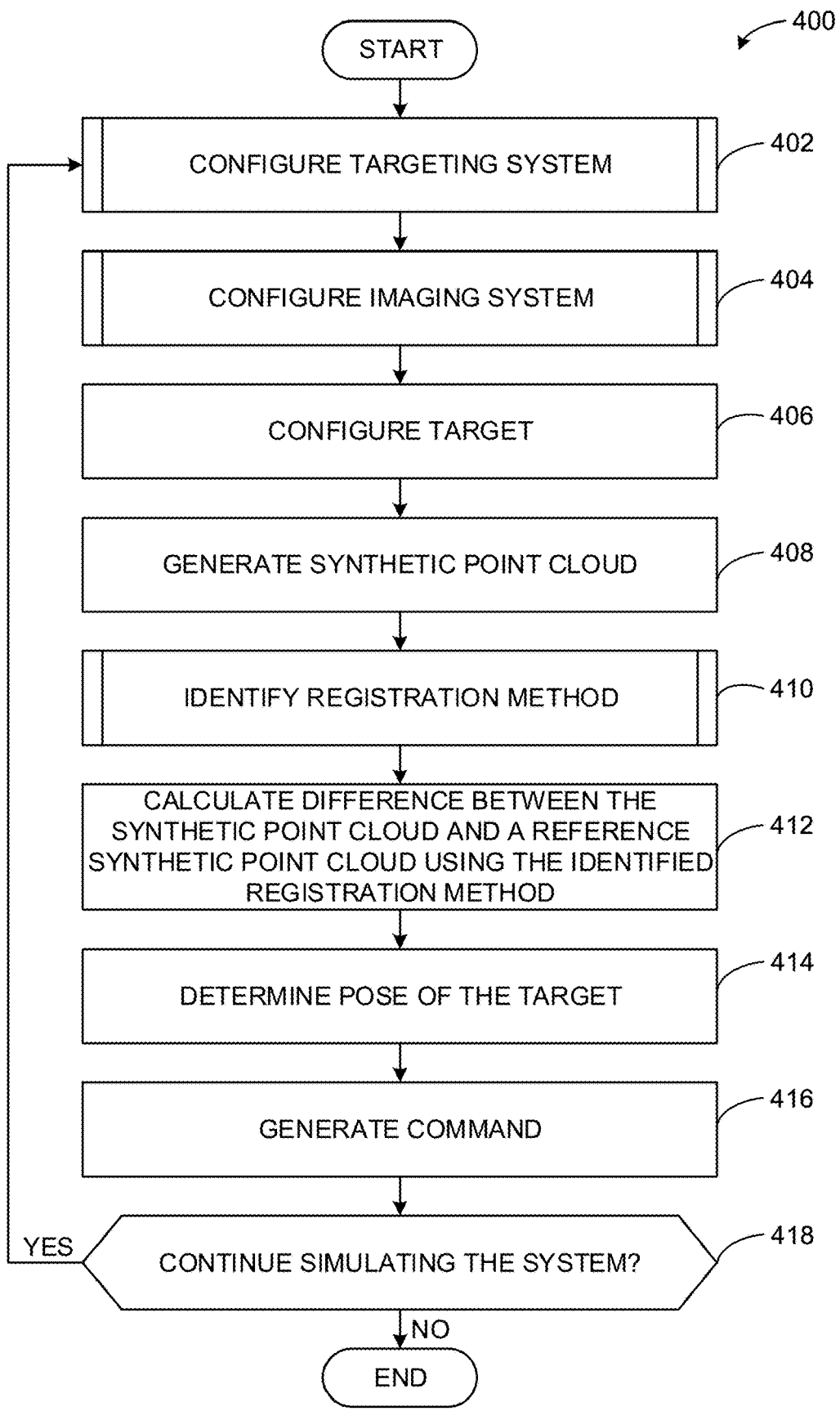
FIGS. 4-8 are flowcharts representative of example methods that may be used to implement the example point cloud manager of FIGS. 1-2.

FIG. 4 is a flowchart representative of an example method 400 that may be performed by the PCM 100 of FIGS. 1-2 to move the target 104 of FIG. 1 in a simulation based on generating a synthetic point cloud image of the target 104. Alternatively, the example method 400 may be performed based on generating a point cloud image of an actual target. The example method 400 begins at block 402 when the example PCM 100 configures a targeting system. For example, the illumination source simulator 202 of FIG. 2 may configure the illumination source 116 of FIG. 1 based on simulating a coherence, a directionality, an intensity, etc., of a laser.

At block 404, the example PCM 100 configures an imaging system. For example, the image sensor simulator 212 of FIG. 2 may configure the image sensor 126 of FIG. 1 based on simulating a conversion gain, a sensitivity, etc., of a light sensor array. At block 406, the example PCM 100 configures a target. For example, the configuration adjuster 252 of FIG. 2 may configure the first surface 132 of the target 104 to have a light reflection characteristic.

At block 408, the example PCM 100 generates a synthetic point cloud. For example, the point cloud generator 220 may generate a synthetic point cloud of the target 104 based on simulating the illumination source 116 scanning the target 104 using an illumination source configuration and the image sensor 126 obtaining a light reflection using an image sensor configuration. At block 410, the example PCM 100 identifies a registration method. For example, the method selector 234 may identify an ICP registration method to be used by the difference calculator 232.

At block 412, the example PCM 100 calculates a difference between the synthetic point cloud and a reference synthetic point cloud using the identified registration method. For example, the difference calculator 232 of FIG. 2 may calculate a difference between the synthetic point cloud and a reference synthetic point cloud of the target 104 using an ICP method. In such an example, the point cloud generator 220 may generate the reference synthetic point cloud of the target 104 based on a 3-D CAD model of the target 104. Alternatively, the example point cloud generator 220 may retrieve the reference synthetic point cloud of the target 104 from the example database 270 of FIG. 2.

At block 414, the example PCM 100 determines a pose of the target. For example, the pose determiner 240 of FIG. 2 may determine a set of coordinates to characterize a position of the target 104 within the computer-generated environment 106 of FIG. 1 based on the difference.

At block 416, the example PCM 100 generates a command. For example, the command generator 260 may generate a command to move the illumination source 116 from a first illumination source pose to a second illumination source pose via the pointing system 118 based on determining the pose of the target 104. In such an example, the command generator 260 may generate the command to move the space vehicle 102 of FIG. 1 closer to the target 104 based on determining the pose of the illumination source 116 relative to the target 104.

At block 418, the example PCM 100 determines whether to continue simulating the system. For example, the command generator 260 may determine to continue simulating the system based on the pose of the illumination source 116 relative to the pose of the target 104 (e.g., the space vehicle 102 successfully docks with the target 104, the space vehicle 102 successfully moved from a first position to a second position etc.). If, at block 418, the example PCM 100 determines to continue simulating the system, control returns to block 402 to configure the targeting system, otherwise the example method 400 concludes.

Figure 5:
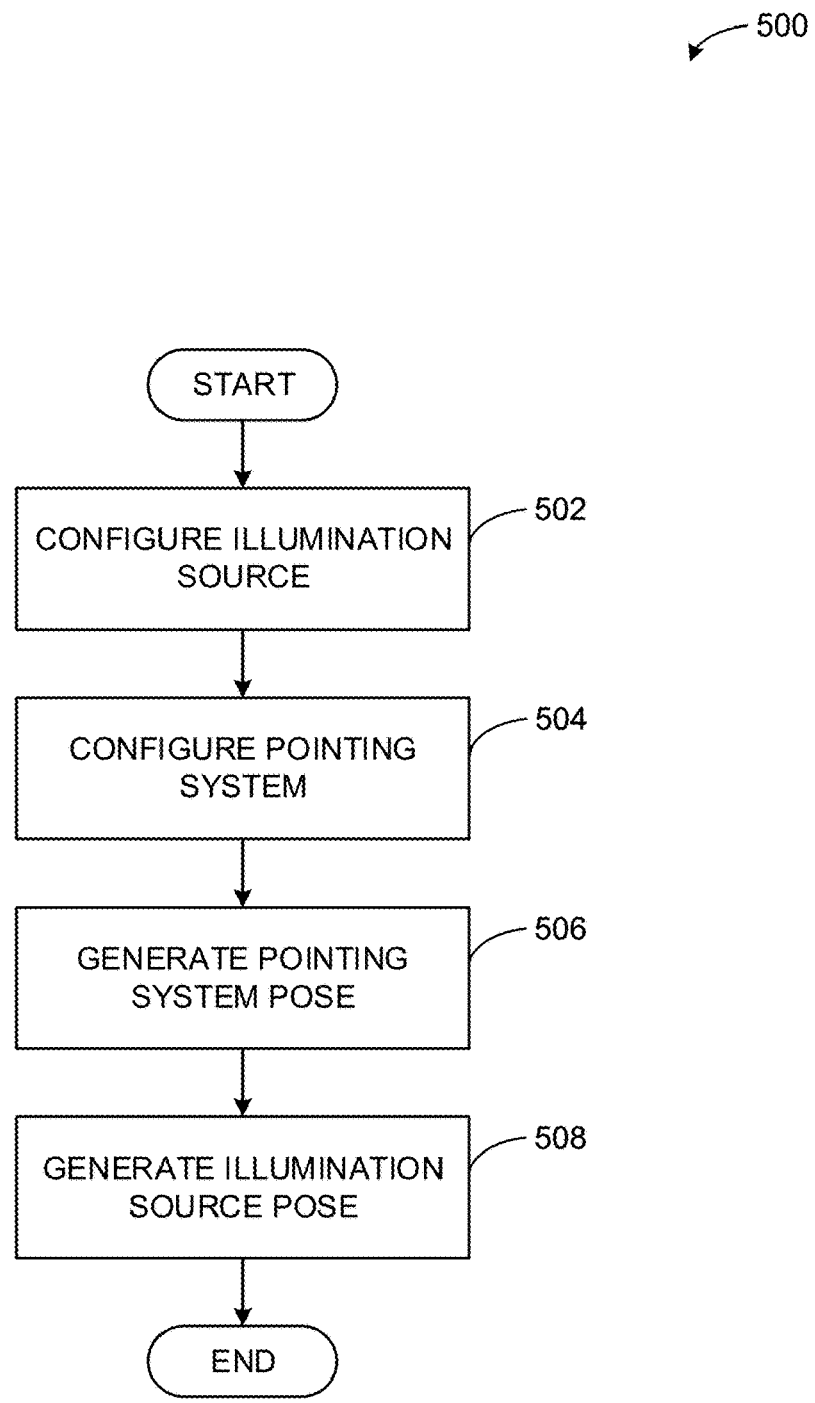

Additional detail in connection with configuring the targeting system (FIG. 4, block 402) is shown in FIG. 5. FIG. 5 is a flowchart representative of an example method 500 that may be performed by the example PCM 100 of FIGS. 1-2 to configure and generate a pose of one or more components of the targeting system 112 of FIG. 1. Alternatively, the example method 500 may be used to configure and generate a pose of one or more components of an actual targeting system.

The example method 500 begins at block 502 when the example PCM 100 configures an illumination source. For example, the illumination source simulator 202 of FIG. 2 may configure the illumination source 116 of FIG. 1 based on simulating a coherence, a directionality, an intensity, etc., of a laser.

At block 504, the example PCM 100 configures a pointing system. For example, the pointing system simulator 204 of FIG. 2 may configure the pointing system 118 of FIG. 1 based on simulating the pointing system 118 having six-degrees of freedom, having a first position (e.g., a position based on a set of coordinates with respect to the X-axis 120, the Y-axis 122, and the Z-axis 124, etc.), etc.

At block 506, the example PCM 100 generates a pointing system pose. For example, the pose determiner 240 of FIG. 2 may determine a set of coordinates to characterize a position of the pointing system 118 within the computer-generated environment 106 of FIG. 1.

At block 508, the example PCM 100 generates an illumination source pose. For example, the pose determiner 240 may determine a set of coordinates to characterize a position of the illumination source 116 based on the pose of the pointing system 118. The example method 500 then ends.

Figure 6:
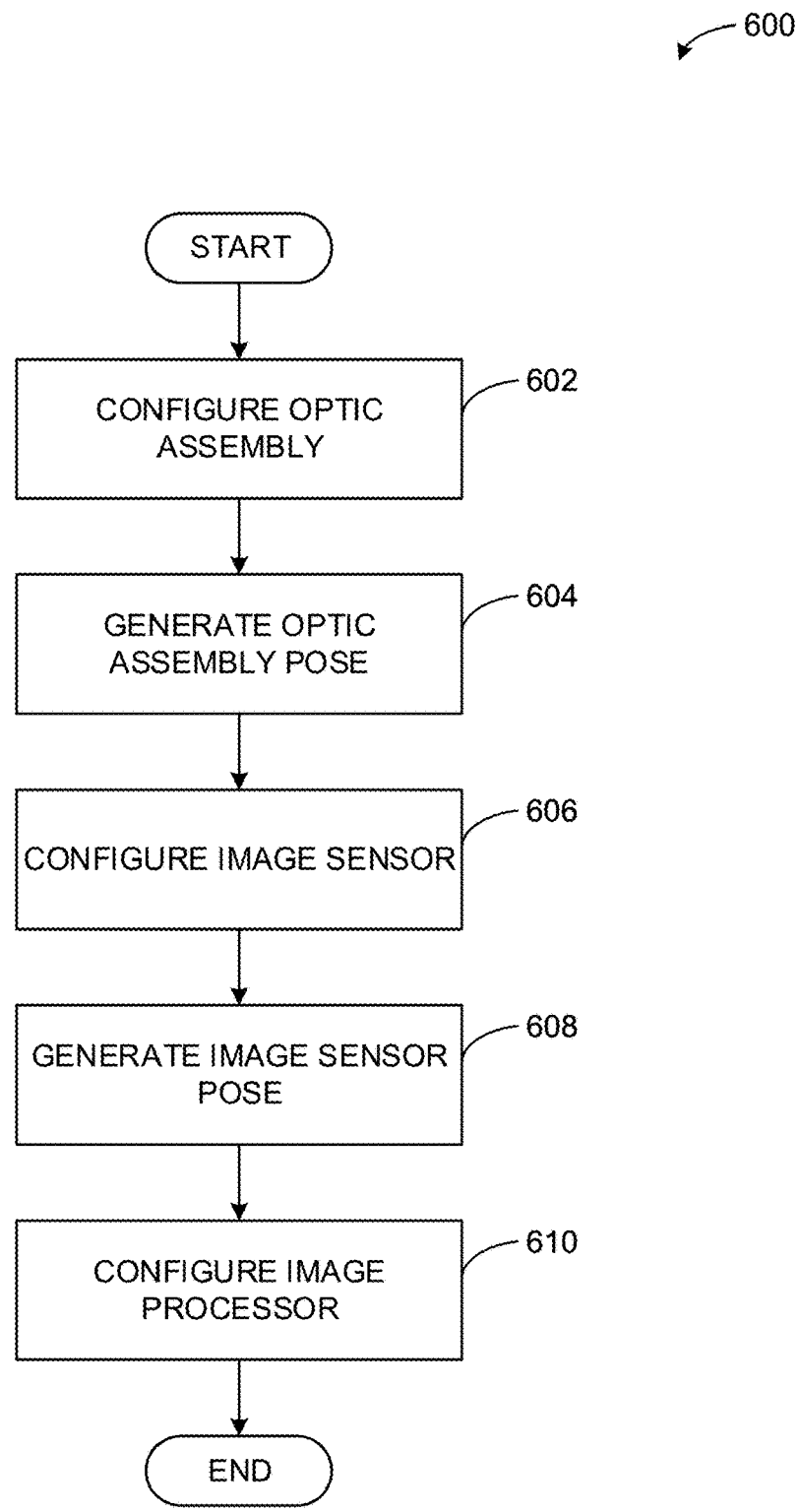

Additional detail in connection with configuring an imaging system (FIG. 4, block 404) is shown in FIG. 6. FIG. 6 is a flowchart representative of an example method 600 that may be performed by the PCM 100 of FIGS. 1-2 to configure and generate a pose of one or more components of the imaging system 114 of FIG. 1. Alternatively, the example method 500 may be used to configure and generate a pose of one or more components of an actual imaging system.

The example method 600 begins at block 602 when the example PCM 100 configures an optic assembly. For example, the optic assembly simulator 214 of FIG. 2 may configure the optic assembly 128 of FIG. 1 based on simulating the optic assembly 128 having six-degrees of freedom, having a second position (e.g., a position based on a set of coordinates with respect to the X-axis 120, the Y-axis 122, and the Z-axis 124, etc.), etc.

At block 604, the example PCM 100 generates an optic assembly pose. For example, the pose determiner 240 of FIG. 2 may determine a set of coordinates to characterize a position of the optic assembly 128 within the computer-generated environment 106 of FIG. 1.

At block 606, the example PCM 100 configures an image sensor. For example, the image sensor simulator 212 of FIG. 2 may configure the image sensor 126 of FIG. 1 based on simulating a conversion gain, a sensitivity, etc., of a light sensor array.

At block 608, the example PCM 100 generates an image sensor pose. For example, the pose determiner 240 of FIG. 2 may determine a set of coordinates to characterize a position of the image sensor 126 within the computer-generated environment 106.

At block 610, the example PCM 100 configures an image processor. For example, the image processor simulator 216 of FIG. 2 may identify an image processing script, program, etc., to be used by the image processor 130 to simulate converting obtained light into a digital representation for analysis, processing, etc. The example method 600 then concludes.

Figure 7:
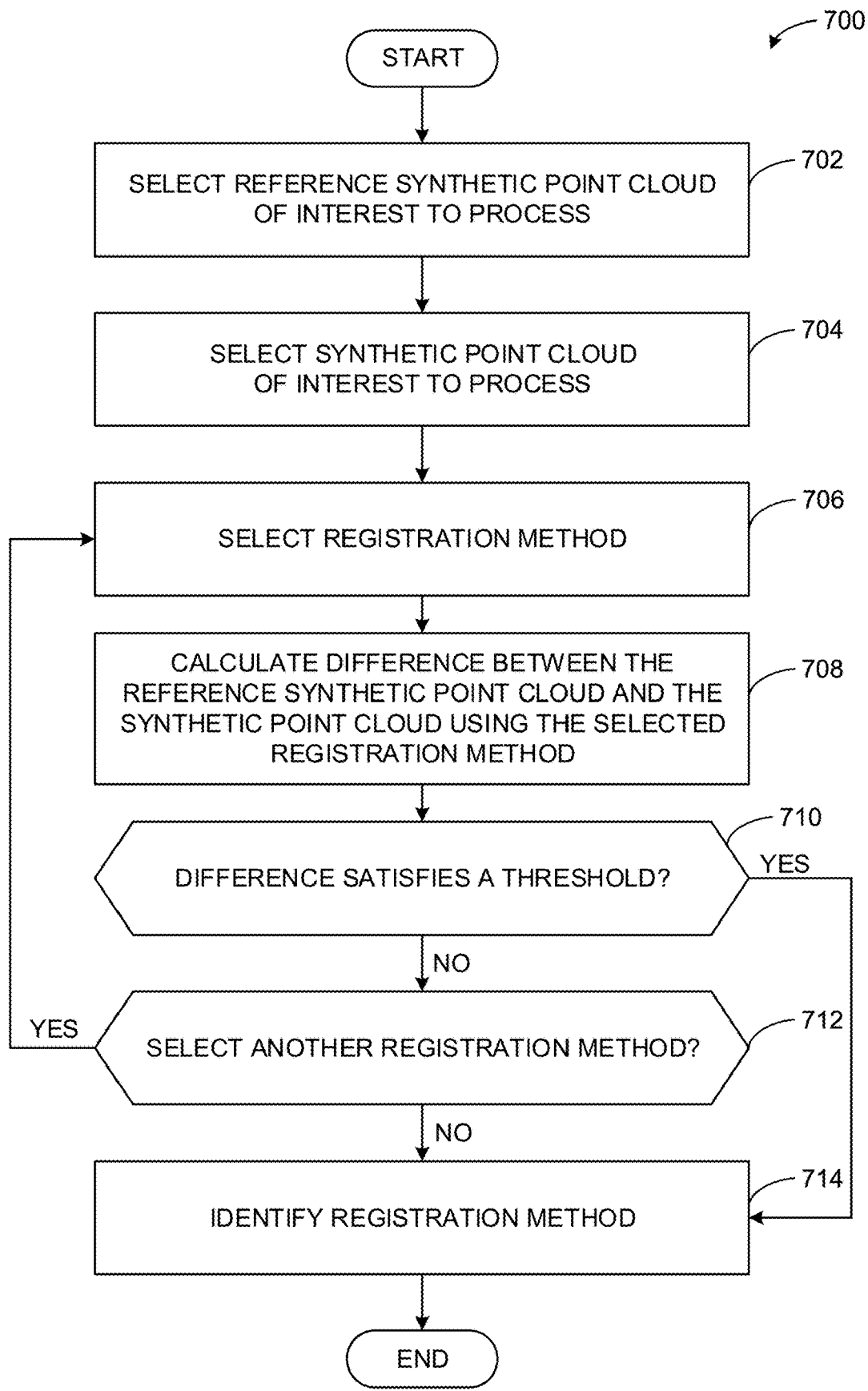

Additional detail in connection with identifying a registration method (FIG. 4, block 410) is shown in FIG. 7. FIG. 7 is a flowchart representative of an example method 700 that may be performed by the example PCM 100 of FIGS. 1-2 to determine a registration method to calculate a difference between a reference synthetic point cloud and a synthetic point cloud. Alternatively, the example method 700 may be performed to calculate a difference between a reference point cloud and a point cloud of an actual object. The example method 700 begins at block 702 when the example PCM 100 selects a reference synthetic point cloud of interest to process. For example, the method selector 234 of FIG. 2 may select a reference synthetic point cloud of the target 104 of FIG. 1 based on a 3-D CAD model of the target 104.

At block 704, the example PCM 100 selects a synthetic point cloud of interest to process. For example, the method selector 234 may select a synthetic point cloud of the target 104 generated by the point cloud generator 220 of FIG. 2. At block 706, the example PCM 100 selects a registration method. For example, the method selector 234 may select an ICP registration method.

At block 708, the example PCM 100 calculates a difference between the reference synthetic point cloud and the synthetic point cloud using the selected registration method. For example, the difference calculator 232 may calculate a difference between the reference synthetic point cloud and the synthetic point cloud of the target 104 using the ICP registration method.

At block 710, the example PCM 100 determines whether the difference satisfies a threshold. For example, the difference calculator 232 may determine whether the difference satisfies an error threshold (e.g., the difference is less than 1%, less than 5%, etc.).

If, at block 710, the example PCM 100 determines that the difference satisfies the threshold, control proceeds to block 714 to identify a registration method. If, at block 710, the example PCM 100 determines that the difference does not satisfy the threshold, then, at block 712, the PCM 100 determines whether to select another registration method. For example, the method selector 234 may determine that there is another registration method that has not yet been selected.

If, at block 712, the example PCM 100 determines to select another registration method, control returns to block 706 to select another registration method. If, at block 712, the example PCM 100 determines not to select another registration method, then, at block 714, the PCM 100 identifies a registration method. For example, the method selector 234 may identify the ICP registration method based on the difference calculated using the ICP registration method satisfying the error threshold. The example method 700 then concludes.

Figure 8:
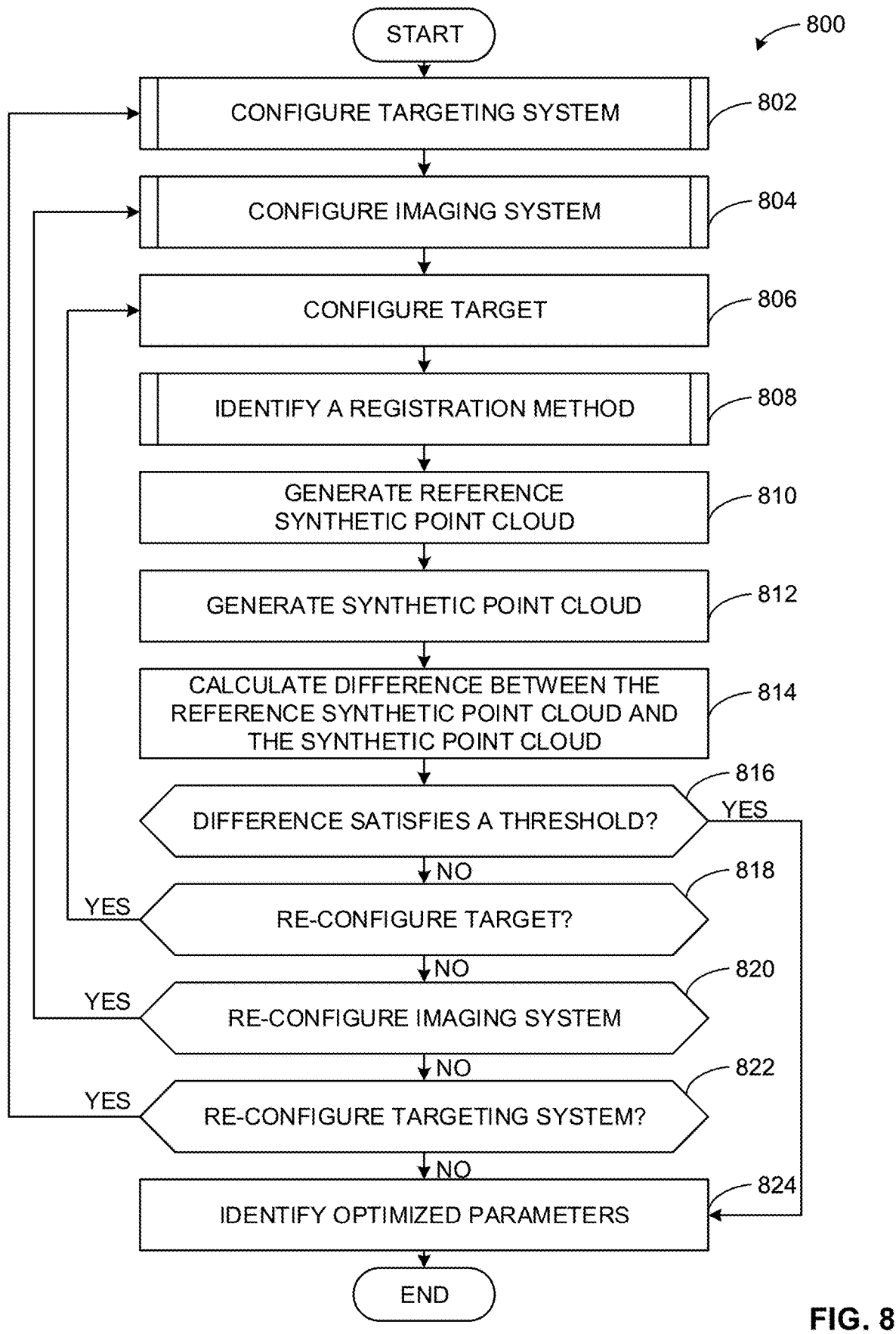

FIG. 8 is a flowchart representative of an example method 800 that may be performed by the example PCM 100 of FIGS. 1-2 to optimize an object in the computer-generated environment 106 of FIG. 1. Alternatively, the example method 800 may be used to optimize an object in real-time operation. The example method 800 begins at block 802 when the example PCM 100 configures a targeting system. For example, the targeting system manager 200 of FIG. 2 may configure the targeting system 112 of FIG. 1 in accordance with the example method 500 of FIG. 5 using a first targeting system configuration.

At block 804, the example PCM 100 configures an imaging system. For example, the PCM 100 may configure the imaging system 114 of FIG. 1 in accordance with the example method 600 of FIG. 6 using a first imaging system configuration. At block 806, the example PCM 100 configures a target. For example, the configuration adjuster 252 may configure one or more components of the target 104 using a first target configuration (e.g., a first light reflection characteristic of the first surface 132, etc.).

At block 808, the example PCM 100 identifies a registration method. For example, the method selector 234 may identify a registration method in accordance with the example method 700 of FIG. 7. At block 810, the example PCM 100 generates a reference synthetic point cloud. For example, the point cloud generator 220 may generate a reference synthetic point cloud of the target 104 based on a 3-D CAD model of the target 104.

At block 812, the example PCM 100 generates a synthetic point cloud. For example, the point cloud generator 220 may generate a synthetic point cloud of the target 104 by simulating the targeting system 112 and the imaging system 114 of FIG. 1. At block 814, the example PCM 100 calculates a difference between the reference synthetic point cloud and the synthetic point cloud. For example, the difference calculator 232 may calculate a difference between the reference synthetic point cloud and the synthetic point cloud of the target 104 using the identified registration method, the first targeting system configuration, the first imaging system configuration, the first target configuration, etc.

At block 816, the example PCM 100 determines whether the difference satisfies a threshold. For example, the difference calculator 232 may compare the difference to an error threshold and determine whether the difference satisfies the error threshold (e.g., the difference is less than 1%, less than 5%, etc.). In such an example, the difference calculator 232 may determine that the difference satisfies the error threshold based on the difference being less than the error threshold of 1%.

If, at block 816, the example PCM 100 determines that the difference satisfies the threshold, control proceeds to block 824 to identify optimized parameters. If, at block 816, the example PCM 100 determines that the difference does not satisfy the threshold, then, at block 818, the PCM 100 determines whether to re-configure the target. For example, the configuration adjuster 252 may determine to re-configure the target 104 using a second target configuration (e.g., a second light reflection characteristic, etc.).

If, at block 818, the example PCM 100 determines to re-configure the target, control returns to block 806 to configure the target using the second target configuration. If, at block 818, the example PCM 100 determines not to re-configure the target, then, at block 820, the PCM 100 determines whether to re-configure the imaging system. For example, the configuration adjuster 252 may determine to re-configure the imaging system 114 using a second imaging system configuration (e.g., a second image sensor configuration, a second optic assembly configuration, a second image processor configuration, etc.).

If, at block 820, the example PCM 100 determines to re-configure the imaging system, control returns to block 804 to configure the imaging system using the second imaging system configuration. If, at block 820, the example PCM 100 determines not to re-configure the imaging system, then, at block 822, the PCM 100 determines whether to re-configure the targeting system. For example, the configuration adjuster 252 may determine to re-configure the targeting system 112 using a second targeting system configuration (e.g., a second illumination source configuration, a second pointing system configuration, etc.).

If, at block 822, the example PCM 100 determines to re-configure the targeting system, control returns to block 802 to configure the targeting system using the second targeting system configuration. If, at block 822, the example PCM 100 determines not to re-configure the targeting system, then, at block 824, the PCM 100 identifies optimized parameters. For example, the configuration selector 254 identifies optimized parameters for simulating the illumination source 116, the pointing system 118, the image sensor 126, etc., for minimizing a difference (e.g., a pose difference, etc.) between the reference synthetic point cloud and the point cloud of the target 104. The example method 800 then concludes.

Figure 9:
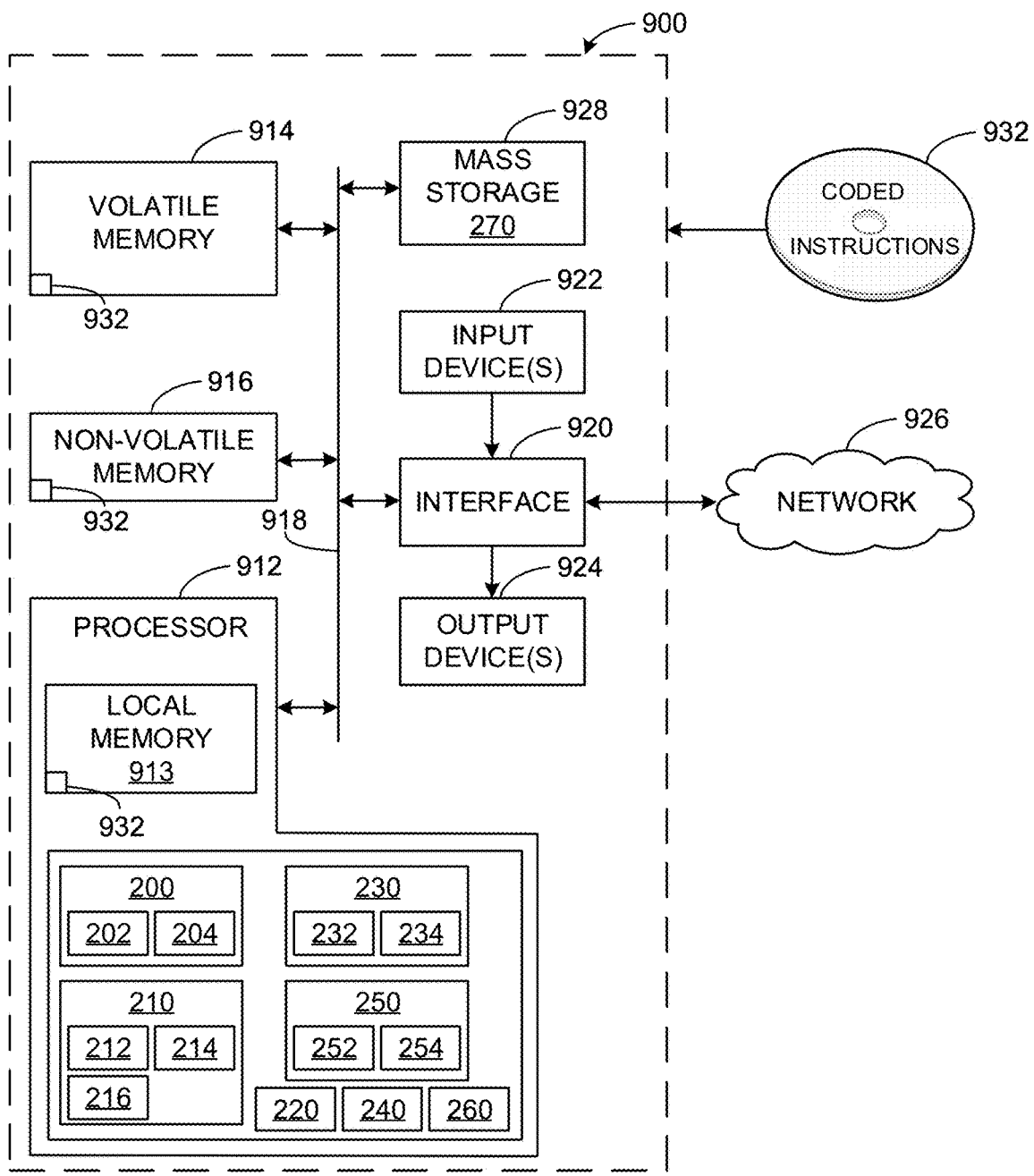
FIG. 9 is a block diagram of an example processing platform structured to execute machine readable instructions to implement the methods of FIGS. 4-8 and/or the example point cloud manager of FIGS. 1-2.

FIG. 9 is a block diagram of an example processor platform 900 capable of executing instructions to implement the methods of FIGS. 4-8 to implement the example PCM 100 of FIGS. 1-2. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the example targeting system manager 200, the example illumination source simulator 202, the example pointing system simulator 204, the example imaging system manager 210, the example image sensor simulator 212, the example optic assembly simulator 214, the example image processor simulator 216, the example point cloud generator 220, the example difference manager 230, the example difference calculator 232, the example method selector 234, the example pose determiner 240, the example configuration manager 250, the example configuration adjuster 252, the example configuration selector 254, and the example command generator 260.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a peripheral component interconnect (PCI) express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. The example mass storage device 928 implements the example database 270 of FIG. 2.

Coded instructions 932 to implement the methods of FIGS. 4-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that implement examples of generating a synthetic point cloud of a spacecraft. The example PCM apparatus disclosed above can optimize parameters corresponding to a spacecraft and/or a target based on varying parameters of one or more components such as a targeting system and an imaging system operatively coupled to the spacecraft, a property of a surface of the target, etc. The example PCM apparatus disclosed above can simulate a response, a behavior, an operation, etc., of the spacecraft using the optimized parameters to determine a feasibility of a design of the spacecraft prior to manufacturing the spacecraft. The example PCM apparatus disclosed above can be used during normal operation of the spacecraft to verify information from computing systems of the spacecraft prior to the spacecraft executing an action based on the information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a point cloud generator to generate a first synthetic point cloud of a first simulated space vehicle in a simulated environment, the first synthetic point cloud based on a simulated illumination source and a simulated image sensor, the simulated illumination source and the simulated image sensor operatively coupled to a second simulated space vehicle at a first position in the simulated environment, the simulated image sensor measuring a parameter of the first simulated space vehicle, the simulated illumination source using a first configuration including a second position of the simulated illumination source within the simulated environment;
a pose determiner to determine a first pose of the simulated illumination source based on a first difference between the first synthetic point cloud and a reference synthetic point cloud using a first registration method;
a targeting system manager to, in response to the first difference not satisfying a threshold, adjust the simulated illumination source from the first configuration to a second configuration, the second configuration including a third position different from the second position, the simulated illumination source to have a second pose based on a second difference between a second synthetic point cloud and the reference synthetic point cloud; and
a command generator to, in response to the second difference satisfying the threshold, generate a command to move the second simulated space vehicle from the first position to a fourth position based on the second pose, the point cloud generator, the pose determiner, the targeting system manager, and the command generator implemented using at least hardware.

2. The apparatus of claim 1, wherein the simulated illumination source represents a laser or an infrared illuminator.

3. The apparatus of claim 1, wherein the second configuration is determined by:
the point cloud generator generating the second synthetic point cloud of the first simulated space vehicle, the second synthetic point cloud based on the simulated illumination source using the second configuration;
a difference calculator calculating the second difference between the second synthetic point cloud and the reference synthetic point cloud using the first registration method; and
a configuration manager to:
compare the first difference to the second difference; and
identify the second configuration based on the comparison, the difference calculator and the configuration manager implemented using at least hardware.

4. The apparatus of claim 1, wherein the first registration method is determined based on a difference calculator calculating the second difference using a second registration method, comparing the first difference to the second difference, and identifying the first registration method based on the comparison, the difference calculator implemented using at least hardware.

5. The apparatus of claim 1, wherein generating at least one of the first synthetic point cloud or the second synthetic point cloud is based on a configuration adjuster to simulate a light reflection characteristic of a surface of the first simulated space vehicle, the configuration adjuster implemented using at least hardware.

6. The apparatus of claim 1, wherein generating the second synthetic point cloud is based on:
a pointing system simulator to simulate a third pose of a simulated pointing system operatively coupled to the simulated illumination source; and
an optic assembly simulator to simulate a fourth pose of an optic assembly operatively coupled to the simulated image sensor, the pointing system simulator and the optic assembly simulator implemented using at least hardware.

7. A method comprising:
generating a first synthetic point cloud of a first simulated space vehicle in a simulated environment, the first synthetic point cloud based on a simulated illumination source and a simulated image sensor, the simulated illumination source and the simulated image sensor operatively coupled to a second simulated space vehicle at a first position in the simulated environment, the simulated image sensor measuring a parameter of the first simulated space vehicle, the simulated illumination source using a first configuration including a second position of the simulated illumination source within the simulated environment;
determining a first pose of the simulated illumination source based on a first difference between the first synthetic point cloud and a reference synthetic point cloud using a first registration method;
in response to the first difference not satisfying a threshold, adjusting the simulated illumination source from the first configuration to a second configuration, the second configuration including a third position different from the second position, the simulated illumination source to have a second pose based on a second difference between a second synthetic point cloud and the reference synthetic point cloud; and
generating a command to move the second simulated space vehicle from the first position to a fourth position based on the second pose.

8. The method of claim 7, wherein the simulated illumination source represents a laser or an infrared illuminator.

9. The method of claim 8, wherein the first configuration is based on at least one of a wavelength, an intensity, a point size, a dispersion, a duration, or a cycle time of the laser.

10. The method of claim 7, wherein the second configuration is determined by:
generating the second synthetic point cloud of the first simulated space vehicle, the second synthetic point cloud based on the simulated illumination source using the second configuration;
calculating the second difference between the second synthetic point cloud and the reference synthetic point cloud using the first registration method;
comparing the first difference to the second difference; and
identifying the second configuration based on the comparison.

11. The method of claim 7, wherein the first registration method is determined by calculating the second difference using a second registration method, comparing the first difference to the second difference, and identifying the first registration method based on the comparison.

12. The method of claim 7, wherein generating at least one of the first synthetic point cloud or the second synthetic point cloud is based on simulating a light reflection characteristic of a surface of the first simulated space vehicle.

13. The method of claim 7, wherein generating the second synthetic point cloud is based on simulating a third pose of a simulated pointing system operatively coupled to the simulated illumination source and simulating a fourth pose of an optic assembly operatively coupled to the simulated image sensor.

14. A non-transitory computer readable storage medium comprising instructions which, when executed, cause a machine to at least:
   generate a first synthetic point cloud of a first simulated space vehicle in a simulated environment, the first synthetic point cloud based on a simulated illumination source and a simulated image sensor, the simulated illumination source and the simulated image sensor operatively coupled to a second simulated space vehicle at a first position in the simulated environment, the simulated image sensor measuring a parameter of the first simulated space vehicle, the simulated illumination source using a first configuration including a second position of the simulated illumination source within the simulated environment;
   determine a first pose of the simulated illumination source based on a first difference between the first synthetic point cloud and a reference synthetic point cloud using a first registration method;
   in response to the first difference not satisfying a threshold, adjust the simulated illumination source from the first configuration to a second configuration, the second configuration including a third position different from the second position, the simulated illumination source to have a second pose based on a second difference between a second synthetic point cloud and the reference synthetic point cloud; and
   in response to the second difference satisfying the threshold, generate a command to move the second simulated space vehicle from the first position to a fourth position based on the second pose.

15. The non-transitory computer readable storage medium of claim 14, wherein the simulated illumination source represents a laser or an infrared illuminator.

16. The non-transitory computer readable storage medium of claim 15, wherein at least one of the first configuration or the second configuration is based on at least one of a wavelength, an intensity, a point size, a dispersion, a duration, or a cycle time of the laser.

17. The non-transitory computer readable storage medium of claim 14, wherein the instructions, when executed, cause the machine to at least:
   generate the second synthetic point cloud of the first simulated space vehicle, the second synthetic point cloud based on the simulated illumination source using the second configuration;
   calculate the second difference between the second synthetic point cloud and the reference synthetic point cloud using the first registration method;
   compare the first difference to the second difference; and
   identify the second configuration based on the comparison.

18. The non-transitory computer readable storage medium of claim 14, wherein the instructions, when executed, cause the machine to at least:
   calculate the second difference using a second registration method;
   compare the first difference to the second difference; and
   identify the first registration method based on the comparison.

19. The non-transitory computer readable storage medium of claim 14, wherein the instructions, when executed, cause the machine to generate at least one of the first synthetic point cloud or the second synthetic point cloud based on simulating a light reflection characteristic of a surface of the first simulated space vehicle.

20. The non-transitory computer readable storage medium of claim 14, wherein the instructions, when executed, cause the machine to at least simulate a third pose of a simulated pointing system operatively coupled to the simulated illumination source and simulate a pose of an optic assembly operatively coupled to the simulated image sensor.

* * * * *